United States Patent

Overstreet

[15] 3,656,059
[45] Apr. 11, 1972

[54] SINGLE SENSOR MOTOR VEHICLE VELOCITY DETECTOR

[72] Inventor: Scott M. Overstreet, Los Altos, Calif.
[73] Assignee: Sylvania Electric Products, Inc.
[22] Filed: May 25, 1970
[21] Appl. No.: 40,247

[52] U.S. Cl. ..............................324/173, 324/179, 340/38 L
[51] Int. Cl. ..................................................G01p 3/54
[58] Field of Search..................324/179, 173, 41; 340/38 L

[56] References Cited

UNITED STATES PATENTS 3,430,221  2/1969  Barringer..........................340/38 L

FOREIGN PATENTS OR APPLICATIONS 829,718  7/1938  France..............................340/38 L

OTHER PUBLICATIONS

Measuring Projectile Velocities– Electronics Industries– October, 1943, pp. 66, 67, 196

Primary Examiner—Michael J. Lynch
Attorney—Norman J. O'Malley, Russell A. Cannon and John F. Lawler

[57] ABSTRACT

In this detector, the sinusoidally varying signal voltage induced in an inductive sense loop by a ferromagnetic motor vehicle passing over it is adjusted by a low pass filter having a 6 db. per octave high frequency roll off characteristic in order to obtain a signal waveform of essentially uniform amplitude regardless of vehicle velocity. The frequency of the initial portion of the induced signal, which is proportional to the vehicle velocity, is measured by sequentially detecting two successive peak transitions of the filtered signal and measuring the time interval therebetween.

3 Claims, 6 Drawing Figures

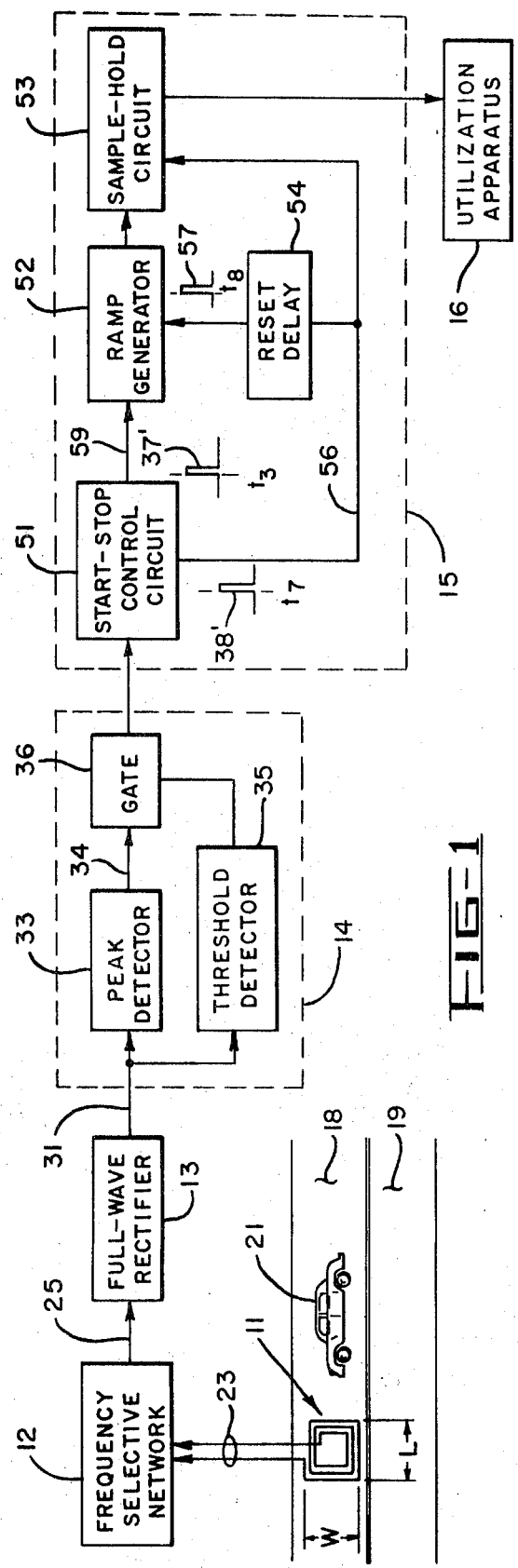
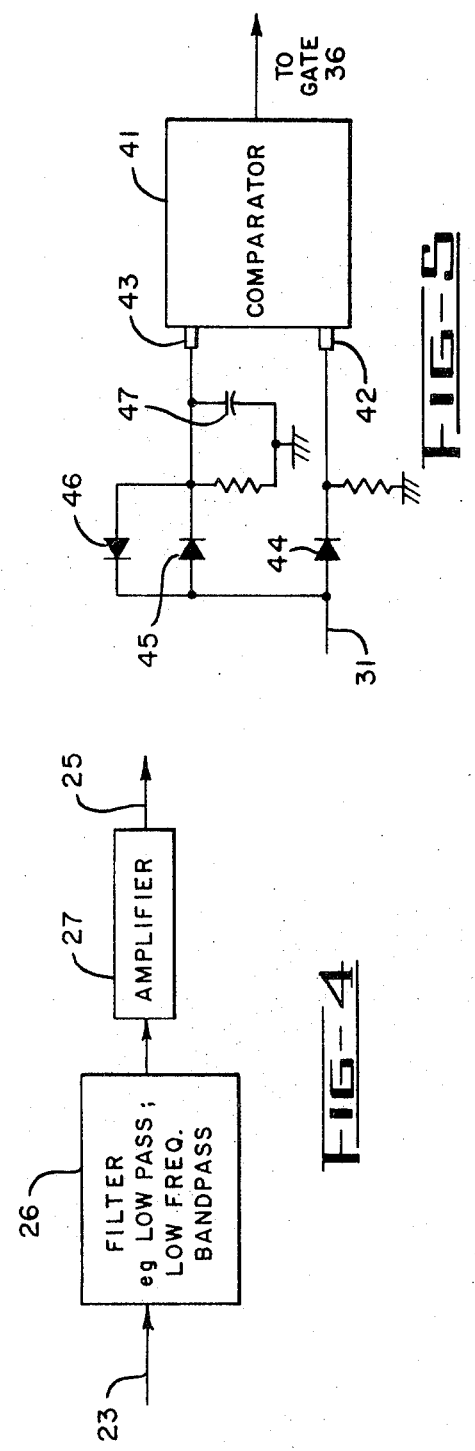

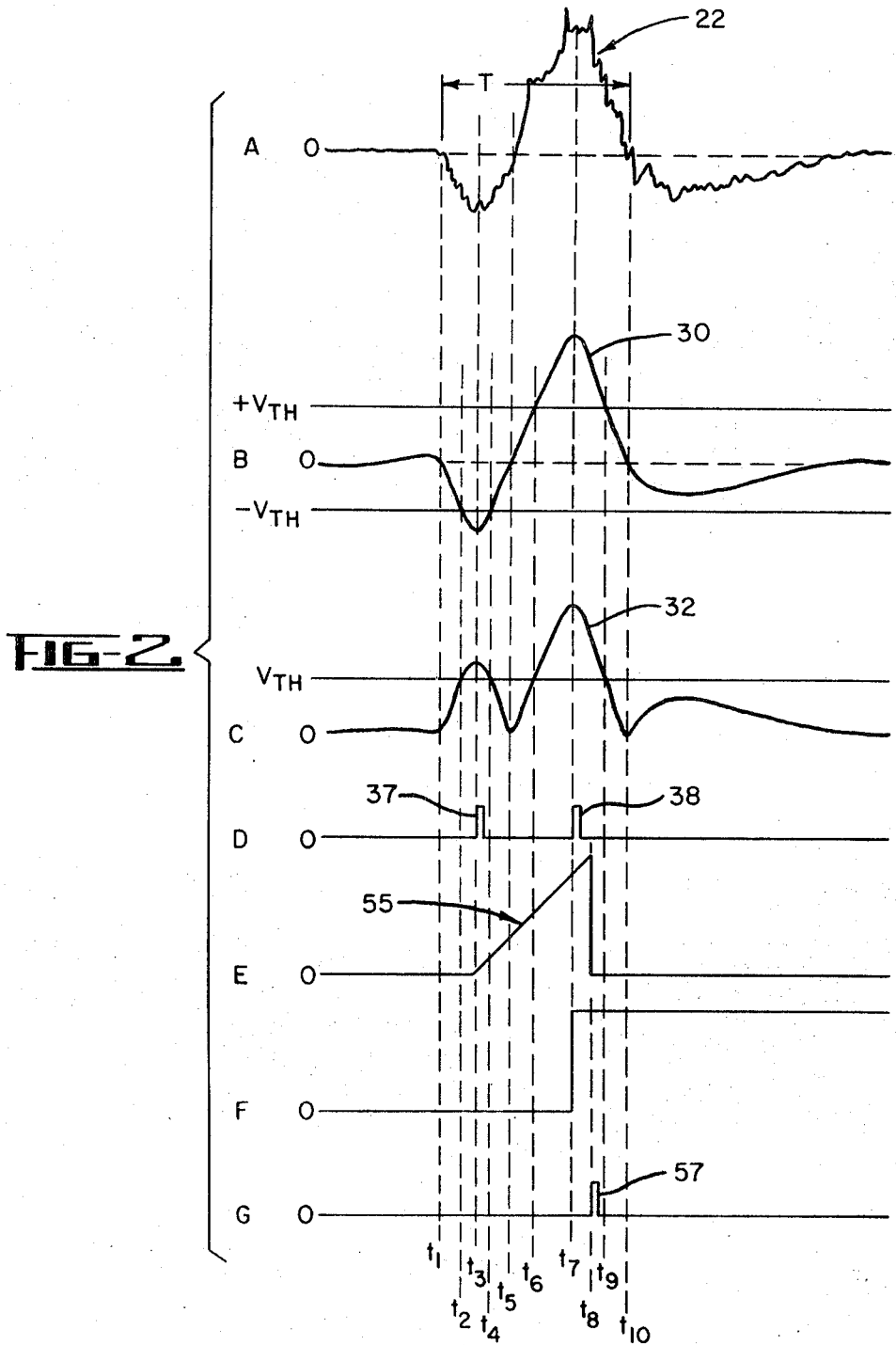

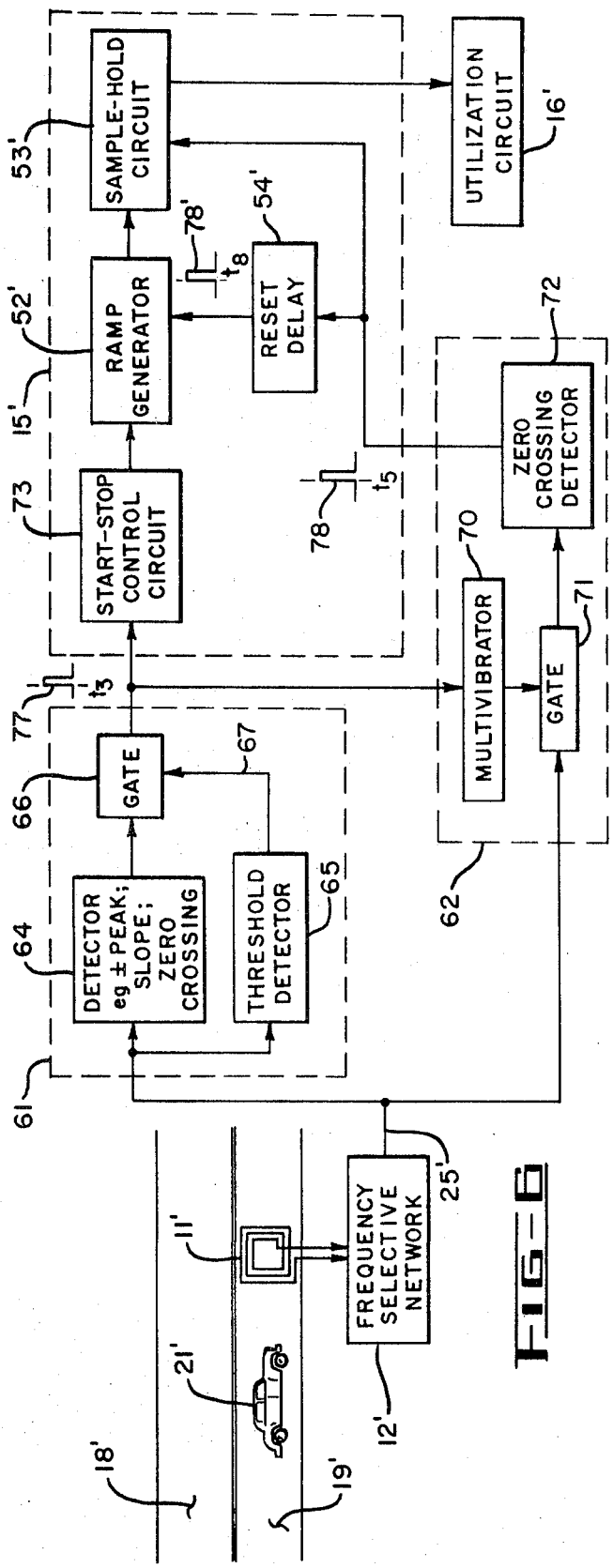
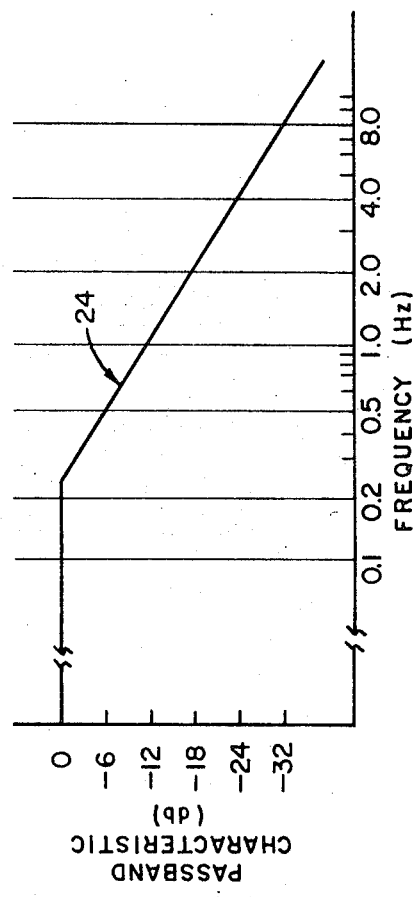

3,656,059

SINGLE SENSOR MOTOR VEHICLE VELOCITY DETECTOR

BACKGROUND OF THE INVENTION

This invention relates to vehicle detectors and more particularly to a motor vehicle velocity detector.

In a system for automatically controlling the traffic lights in a city, the velocity of vehicles traveling past prescribed points on major traffic arteries may be one parameter used in determining the order in which the traffic lights are switched. One technique for detecting vehicle velocity is to measure the time for the vehicle to pass between two stationary sensors spaced a fixed distance apart. Principal disadvantages of such a system are that two sensors are required to measure the velocity of a moving vehicle and that closely spaced vehicles cause the system to produce inaccurate readings. An object of this invention is the provision of a vehicle velocity detector employing only a single passive sensor.

SUMMARY OF INVENTION

In accordance with this invention, the frequency of the initial portion of the signal voltage induced in an inductive sense loop by a motor vehicle passing over it is measured to produce an indication of the vehicle velocity.

BRIEF DESCRIPTION OF DRAWINGS

FIG. 1 is a schematic block diagram of a preferred embodiment of this invention;

FIGS. 2A–2G are waveforms useful in explaining the operation of this invention;

FIG. 3 is a curve representing the passband characteristic of the frequency selective network in FIG. 1;

FIG. 4 is a block diagram of the frequency selective network in FIG. 1;

FIG. 5 is a circuit and block diagram of the peak detector in FIG. 1; and

FIG. 6 is a block diagram of an alternate embodiment of this invention.

DESCRIPTION OF PREFERRED EMBODIMENTS

Referring now to FIG. 1, a system embodying this invention comprises an inductive loop or sense coil 11, a frequency selective network 12, rectifier 13, detection circuit 14, measuring circuit 15, and utilization circuit 16. Loop 11 is located in one of the traffic lanes 18 and 19 of a road. The loop is preferably a large loop comprising several turns of electrically conductive wire and having a length L in the direction of vehicle travel that is approximately one half the length of the shortest vehicle whose speed is to be detected. By way of example, in an embodiment of this invention that was built and tested the loop 11 comprised three turns of No. 14 insulated wire and had a length L of 6 feet and width W of 7 feet. If increased sensitivity is required, the loop may be made of more turns of wire.

When a magnetic body such as a motor vehicle 21 passes over the loop, a signal voltage represented by curve 22 in FIG. 2A is induced in the coil and is applied on lines 23 to the frequency selective network 12. This signal voltage essentially comprises one and one-half cycles of low frequency damped oscillations, the initial portion of which is produced by the front of the vehicle passing over the loop. The high frequency variations in the low frequency signal are believed to be caused by rotary motion induced in the vehicle when the engine is running and vertical vibratory motion of the vehicle as it traverses the loop. It has been discovered that the low frequency of the initial portion of the loop signal voltage (e.g., during the time interval $t_1$ to $t_{10}$ in FIG. 2A) is directly proportional to the vehicle velocity. Thus, the time period T in FIG. 2A decreases as the vehicle velocity increases.

It has been determined that the amplitude of the loop voltage is also proportional to the vehicle velocity. More particularly, the amplitude of the loop voltage increases 6 db each time the vehicle velocity is doubled. This means that the amplitude of the loop signal voltage on lines 23 will vary approximately 36 db for vehicle velocities between 2 and 100 miles per hour. The amplitude of the loop signal voltage, however, is also a function of the height of the undercarriage of the vehicle above the ground. Thus, the signal amplitude is not an absolute indication of vehicle velocity. Also, vehicles traveling in lane 19 may induce signal voltages of sufficient amplitude (i.e., within the 36 db dynamic range) in inductive loop 11 to produce false indications of motor vehicles traveling in the associated lane 18 unless the amplitude difference due to the physical separation of the two lanes is maintained by using the frequency selective network.

In accordance with this invention, the loop signal voltage on lines 23 is coupled through a frequency selective network 12 having a passband characteristic such as that represented by the curve 24 in FIG. 3 for producing on line 25 a signal voltage having an amplitude that is relatively constant and independent of vehicle velocity. The passband characteristic of network 12 may, by way of example, have a break frequency of 0.25 Hz which corresponds to a vehicle velocity of approximately 5 miles per hour and a roll off of 6 db per octave. Network 12 may comprise a low pass filter 26 having the frequency response represented by curve 24 and an amplifier 27 (see FIG. 4). Alternatively, filter 26 may be a low frequency bandpass filter having a 6 db per octave roll off. Also, network 12 may comprise an amplifier having a gain response characteristic similar to that represented by curve 24. If the loop signal voltage on lines 23 is of sufficient amplitude, the network 12 may comprise a single low pass or low frequency bandpass filter. The waveforms in FIGS. 2A and 2B represent the loop signal voltage before and after filtering by network 12, respectively, for a vehicle traversing the loop at 10 miles per hour. Reference to these waveforms reveals that the high frequency noise components in the loop signal voltage are also removed by the filtering action of network 12.

Rectifier 13 is preferably a full wave rectifier for converting the sinusoidally varying signal voltage (see curve 30, FIG. 2B) on line 25 to a signal voltage on line 31 wherein all of the signal variations are of the same polarity (see curve 32 FIG. 3C).

Circuit 14 comprises peak detector circuit 33, threshold detector circuit 35, and gate circuit 36. Detector 33 is responsive to the signal voltage 32 on line 31 for producing on line 34 the pulses 37 and 38 indicating the occurrence of the peak transitions of curve 32 at times $t_3$ and $t_7$, respectively. Referring now to FIG. 5, detector 33 comprises a comparator 41 having first and second inputs 42 and 43 connected through diodes 44 and 45, respectively, to line 31. A third diode 46 is connected in parallel with diode 45 in the opposite polarity. A storage capacitor 47 is connected between the second input 43 of the comparator and a ground reference potential.

Measuring circuit 15 comprises start-stop control circuit 51, ramp generator 52, sample hold circuit 53 and reset delay circuit 54. Control circuit 51 is responsive to the successive pulses 37 and 38 passed by gate 36 for causing generator 52 to initiate generation of the linear ramp voltage represented by curve 55 in FIG. 2E. Circuit 53 is responsive to the output pulse 38' produced on line 56 by the control circuit at time $t_7$ for sampling and holding a voltage corresponding to the amplitude of the ramp voltage 55. Delay circuit 54 is responsive to the pulse 38' for producing a control pulse 57 at time $t_8$, see FIG. 2G, for resetting the ramp generator.

During quiescent operation when the voltage on line 31 is less than the threshold level $V_{TH}$ of detector 35, see FIG. 2C, this circuit 35 operates in a first conduction state to produce an output voltage that maintains gate 36 closed. Consider now that a motor vehicle 21 traveling at a velocity of 10 miles per hour traverses the loop 11 causing network 12 to produce on line 25 the signal voltage represented by curve 30 in FIG. 2B. When the magnitude of the rectified signal voltage 32 exceeds the threshold level $V_{TH}$ at time $t_2$, detector 35 changes conduction states to produce an output voltage that opens gate 36 until the signal voltage falls below this threshold level at $t_4$. As the signal voltage 32 becomes more positive, diodes 44 and 45 both conduct whereas diode 46 is reverse biased and cut off (see FIG. 5). This causes capacitor 47 to store a charge corresponding to the input signal voltage on line 31. Since the same signal voltage is applied to both of the input terminals of the comparator, the output thereof is constant. When the signal voltage 32 falls below its peak value at time $t_3$, diode 45 is reverse biased and cut off by the charge stored on capacitor 47 which maintains the voltage on terminal 43 essentially constant. Diode 44, however, continues to conduct causing the signal voltage on terminal 42 to decrease. When the difference in potential between terminals 42 and 43 exceed a prescribed threshold level, the comparator produces an output pulse 37 indicating the occurrence of the peak voltage transition at time $t_3$. Control circuit 51 is responsive to the pulse 37 for producing the pulse 37' on line 59 which causes generator 52 to produce the linear ramp voltage 55.

In a similar manner, circuit 14 is responsive to the signal voltage 32 between times $t_6$ and $t_9$ for producing the pulse 38 indicating the occurrence of the peak transition at time $t_7$. Control circuit 51 is responsive to the pulse 38 for producing the control pulse 38' on line 56 at time $t_7$. Circuit 53 is responsive to the control pulse 38' for sampling and holding the present value of the ramp voltage which is an indication of the velocity of the motor vehicle and is applied to utilization apparatus 16. Delay circuit 54 is also responsive to the control pulse 38' for producing the delayed control pulse 57 at time $t_8$ which resets the ramp generator.

Referring now to FIG. 6, an alternate embodiment of this invention comprises a loop 11', frequency selective network 12', detection circuits 61 and 62, and measuring circuit 15'. Similar components in FIGS. 1 and 6 are represented by primed reference characters in the latter.

Detection circuit 61 is operative for detecting one transition of the signal voltage 30 on line 25'. Detection circuit 62 is operative for detecting a transition of the signal voltage on line 25' occurring subsequent to the one transition. Circuit 61 comprises a detector 64, a threshold detector 65 and a gate circuit 66. Detector 64 may be: a circuit similar to that illustrated in FIG. 5 for detecting the occurrence of a positive or negative (±) peak of the signal voltage 30 at time $t_7$ or $t_3$; a circuit for detecting a change in the polarity of the slope of the signal voltage 30 at times $t_3$ and $t_7$; or a circuit for detecting a zero crossing transition of the signal voltage 30 at times $t_1$, $t_5$ and $t_{10}$. Detector 65 comprises circuitry for producing on line 67 a control voltage that opens gate 66 when the absolute value of the signal voltage 30 is greater than a prescribed threshold level $V_{TH}$ (see FIG. 2B). Detector 65 is preferably operative for opening gate 66 only during the one-half cycle of the signal voltage 30 between time $t_1$ and $t_5$.

Detection circuit 62 comprises multivibrator 70, gate circuit 71 and zero crossing detector 72. Multivibrator 70 is responsive to the output of gate 66 for changing operating states to open gate 71 for a prescribed time interval to pass the signal voltage on line 25' to the zero crossing detector. The prescribed time interval that gate 71 is open is preferably equal to approximately T/2 for the waveform corresponding to a vehicle traveling at the slowest velocity to be measured. The multivibrator 70 may, by way of example, be a one-shot multivibrator.

Measuring circuit 15' comprises a start-stop control circuit 73 receiving the output of gate 66. The operation of control circuits 51 and 73 are similar.

In operation, when the magnitude of the signal voltage 30 on line 25' exceeds the threshold level $V_{TH}$ at time $t_2$, detector 65 changes operating states to produce on line 67 an output that opens gate 66. When the signal voltage 30 reaches its peak value at time $t_3$, detector 64 produces an output pulse 77 which is passed by gate 66. Multivibrator 70 is responsive to this control pulse for opening gate 71 to pass the signal voltage 30 on line 25'. Control circuit 73 is also responsive to the pulse 77 for causing generator 52' to initiate generation of a ramp voltage. When the signal voltage 30 crosses the zero volt reference level at $t_5$, detector 72 produces the control pulse 78 which causes circuit 53' to sample and hold the peak value of the ramp voltage output of generator 52' at time $t_5$ which is proportional to the frequency of the loop signal 30 and the vehicle velocity. Delay circuit 54' is responsive to the control pulse 78 for producing at time $t_8$ the delayed control pulse 78' which resets generator 52'.

What is claimed is:

1. Apparatus for detecting the velocity of a moving vehicle comprising
    a single passive sensor comprising an inductive loop of electrically conductive wire oriented with respect to a roadway such that a vehicle moving in a prescribed orientation with respect to said loop induces a sinusoidally varying voltage in said loop,
    means for measuring the frequency of the initial portion of said induced signal voltage for producing an indication of the vehicle velocity, comprising
    first means for detecting the occurrence of one transition of said induced signal voltage,
    second means for detecting the occurrence of a transition of said induced signal voltage occurring subsequent to said one transition, and
    means for measuring the time interval between the occurrence of said one and said subsequent transition for producing an indication of the vehicle velocity,
    frequency selective means for coupling the induced signal voltage in said loop to said first and second detecting means, said frequency selective means having a low frequency pass characteristic with a high frequency roll off of approximately 6 db per octave, and
    means for converting the sinusoidal variations of the induced signal voltage from said frequency selective means to one polarity with respect to a reference potential,
    said first and second detecting means comprising
    third means responsive to the output of said converting means for detecting the time of occurrence of the peak values of consecutive variations of signal voltage.

2. Apparatus according to claim 1 wherein said time interval measuring means comprises
    a generator responsive to one output of said third detecting means for initiating generation of a linear ramp voltage, and
    a circuit responsive to a subsequent output of said third detecting means for sampling and holding the magnitude of the ramp voltage, the amplitude of the ramp voltage being a measure of the vehicle velocity.

3. Apparatus for detecting the velocity of a moving vehicle comprising
    an inductive loop of electrically conductive wire oriented with respect to a roadway such that a vehicle moving in a prescribed orientation with respect to said loop induces a sinusoidally varying voltage in said loop,
    means for measuring the frequency of the initial portion of said induced signal voltage for producing an indication of the vehicle velocity, comprising
    first means for detecting the occurrence of one transition of said induced signal voltage,
    second means for detecting the occurrence of a transition of said induced signal voltage occurring subsequent to said one transition, and
    means for measuring the time interval between the occurrence of said one and said subsequent transitions for producing an indication of the vehicle velocity,
    frequency selective means for coupling the induced signal voltage in said loop to said first and second detecting means, said frequency selective means having a low frequency pass characteristic with a high frequency roll off of approximately 6 db per octave, and
    means for converting the sinusoidal variations of the induced signal voltage from said frequency selective means to one polarity with respect to a reference potential,
    said first and second detecting means comprising third means responsive to the output of said converting means for detecting the time of occurrence of the peak values of consecutive variations of the signal voltage, said third detecting means comprising a comparator having first and second input terminals and an output terminal, first and second diodes connected in the same polarity between the first and second input terminals, respectively, of said comparator and the output of said converting means, a capacitor connected between said second input terminal of said comparator and a reference potential, and a third diode connected in the opposite polarity in parallel with said second diode.

* * * * *